United States Patent
Clark

(10) Patent No.: US 12,505,706 B2
(45) Date of Patent: Dec. 23, 2025

(54) IN-VEHICLE MODE SUPPORT FOR VEHICLE SHARING CIRCUMSTANCES

(71) Applicant: FORD GLOBAL TECHNOLOGIES, LLC, Dearborn, MI (US)

(72) Inventor: Karl Nathan Clark, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 17/949,432

(22) Filed: Sep. 21, 2022

(65) Prior Publication Data

US 2024/0096141 A1   Mar. 21, 2024

(51) Int. Cl.
| | |
|---|---|
| G07C 5/02 | (2006.01) |
| B60W 50/14 | (2020.01) |
| G07C 5/08 | (2006.01) |
| G07C 9/00 | (2020.01) |

(52) U.S. Cl.
CPC ............... G07C 5/02 (2013.01); B60W 50/14 (2013.01); G07C 5/08 (2013.01); G07C 9/00309 (2013.01); *B60W 2050/146* (2013.01); *G07C 2009/00769* (2013.01); *G07C 2209/08* (2013.01)

(58) Field of Classification Search
CPC .......... G07C 5/02; G07C 5/08; G07C 5/0825; G07C 9/00309; G07C 2009/00769; G07C 2209/08; B60W 50/14; B60W 2050/146
USPC .......................................................... 701/10
See application file for complete search history.

(56) References Cited

U.S. PATENT DOCUMENTS

| | | | |
|---|---|---|---|
| 10,668,930 B1 * | 6/2020 | Harvey | G06Q 30/0645 |
| 10,831,859 B2 | 11/2020 | Van Wiemeersch et al. | |
| 11,042,952 B2 | 6/2021 | Vij | |
| 11,216,819 B1 * | 1/2022 | Lesesky | G06Q 20/3278 |
| 11,257,146 B1 * | 2/2022 | Harvey | G06Q 50/40 |
| 2002/0186144 A1 * | 12/2002 | Meunier | G07B 15/00 340/901 |
| 2011/0213629 A1 | 9/2011 | Clark et al. | |
| 2014/0129053 A1 * | 5/2014 | Kleve | B60R 25/24 701/2 |
| 2015/0161832 A1 * | 6/2015 | Esselink | G07C 9/00571 340/5.22 |
| 2015/0371153 A1 * | 12/2015 | Lohmeier | G06Q 40/08 705/5 |

(Continued)

FOREIGN PATENT DOCUMENTS

WO   WO-2022129684 A1 *   6/2022   ............. B60R 25/24

*Primary Examiner* — Aniss Chad
(74) *Attorney, Agent, or Firm* — Joseph Zane; Brooks Kushman P.C.

(57) ABSTRACT

A vehicle determines that it is under use in a temporary-user state for which a temporary use period is defined. The vehicle, responsive to being under use in the temporary use state, engages a vehicle temporary use mode, including automatic capture of vehicle states when the mode is engaged. Further, the vehicle, responsive to the engagement of the temporary use mode, displays at least one of vehicle documentation or a selectable option to display vehicle documentation on a vehicle display. The vehicle additionally monitors the vehicle while use of the vehicle is performed during the temporary use period and notifies a driver, via the vehicle display, of vehicle use, determined by the monitoring, that does not conform to any restrictions defined by an agreement relating to the temporary use period.

12 Claims, 3 Drawing Sheets

(56) References Cited

U.S. PATENT DOCUMENTS

| | | | |
|---|---|---|---|
| 2016/0364812 A1 | 12/2016 | Cao | |
| 2017/0324817 A1* | 11/2017 | Oliveira | H04L 67/10 |
| 2018/0174264 A1* | 6/2018 | Stock | G06Q 30/0609 |
| 2020/0051347 A1* | 2/2020 | Bohl | G06Q 10/04 |
| 2020/0242858 A1* | 7/2020 | Meroux | G08G 1/0141 |
| 2020/0394571 A1 | 12/2020 | Tokuchi | |
| 2022/0005141 A1* | 1/2022 | Ito | B60R 25/01 |
| 2022/0050925 A1* | 2/2022 | Gyllenram | G06F 21/6245 |
| 2022/0138700 A1* | 5/2022 | Oehler | G07C 5/008 |
| | | | 705/305 |
| 2022/0301044 A1* | 9/2022 | Löthman | G06F 16/9536 |
| 2023/0316927 A1* | 10/2023 | Kumavat | B60W 60/00256 |
| | | | 701/25 |

* cited by examiner

IN-VEHICLE MODE SUPPORT FOR VEHICLE SHARING CIRCUMSTANCES

TECHNICAL FIELD

The illustrative embodiments generally relate to methods and apparatuses for in-vehicle mode support for vehicle sharing circumstances.

BACKGROUND

While many people own vehicles for personal and business use, it is a reality of vehicle ownership that the majority of vehicles sit unused for the majority of time. Unless a vehicle is actively used in work, it is typically used as a transportation means to and from places of school or work, and the remainder of the day the vehicle will often sit unused. Similarly, at nights, and/or on weekends, vehicles frequently sit stationary.

Recognizing this, businesses have been proposed that allow people to rent out their personal vehicles for periods of time, usually of fairly limited duration—e.g., a first party rents a vehicle to a second party for a two hour duration. Regardless of the duration of rental, however, the personally-owned vehicle can be rented temporarily on an on-demand basis, allowing for people to potentially cover full or partial price of a vehicle simply by allowing others to use the vehicle for limited time periods.

Since the typical vehicle owner is not set up to run a full vehicle rental business, however, there are a number of factors that need to be accommodated in such models. Owners may have difficulty transferring keys, recording vehicle data, cleaning vehicles, etc. Also, owners may not provide formal documentation with each rental, and important information such as registration and insurance, which may be contained in an owner wallet or purse, may not be provided each time a rental is made.

SUMMARY

In a first illustrative embodiment, a system includes one or more processors configured to determine that a vehicle is under use in a temporary-user state for which a temporary use period is defined. The one or more processors are also configured to, responsive to the vehicle being under use in the temporary use state, engage a vehicle temporary use mode, including automatic capture of vehicle states when the mode is engaged. Further, the one or more processors are configured to, responsive to the engagement of the temporary use mode, display at least one of vehicle documentation or a selectable option to display vehicle documentation on a vehicle display. The one or more processors are additionally configured to monitor the vehicle while use of the vehicle is performed during the temporary use period and notify a driver, via a vehicle display, of vehicle use, determined by the monitoring, that does not conform to any restrictions defined by an agreement relating to the temporary use period.

In a second illustrative embodiment, a method includes determining that a temporary use period for a vehicle is within a threshold time of beginning. The method also includes, responsive to the determining, increasing vehicle interior temperature to a point predefined as resulting in acceptable sanitization of the vehicle interior. The method further includes engaging vehicle cooling systems to return the vehicle interior temperature to a point predefined as suitable for travel following the increase in temperature. Additionally, the method includes reporting successful sanitization of the vehicle to at least one of a vehicle owner or a party designated to be using the vehicle for the temporary use period.

In a third illustrative embodiment, a method includes changing a vehicle into a mode defined for a predefined temporary use period, including imaging of at least one of vehicle interiors or exteriors using vehicle cameras, capturing and storing vehicle system states including at least odometer and fuel levels, and capturing and storing any diagnostic trouble codes indicated by a vehicle bus. The method also includes displaying a vehicle report on an in-vehicle display, including the results of the imaging and data captured by the capturing of the vehicle system states and diagnostic trouble codes. Further, the method includes receiving selection of an element of the displayed vehicle report and receiving user input in conjunction with the selected element. The method additionally includes transmitting indication of the selected element and the user input to a vehicle owner.

DETAILED DESCRIPTION

Figure 1:
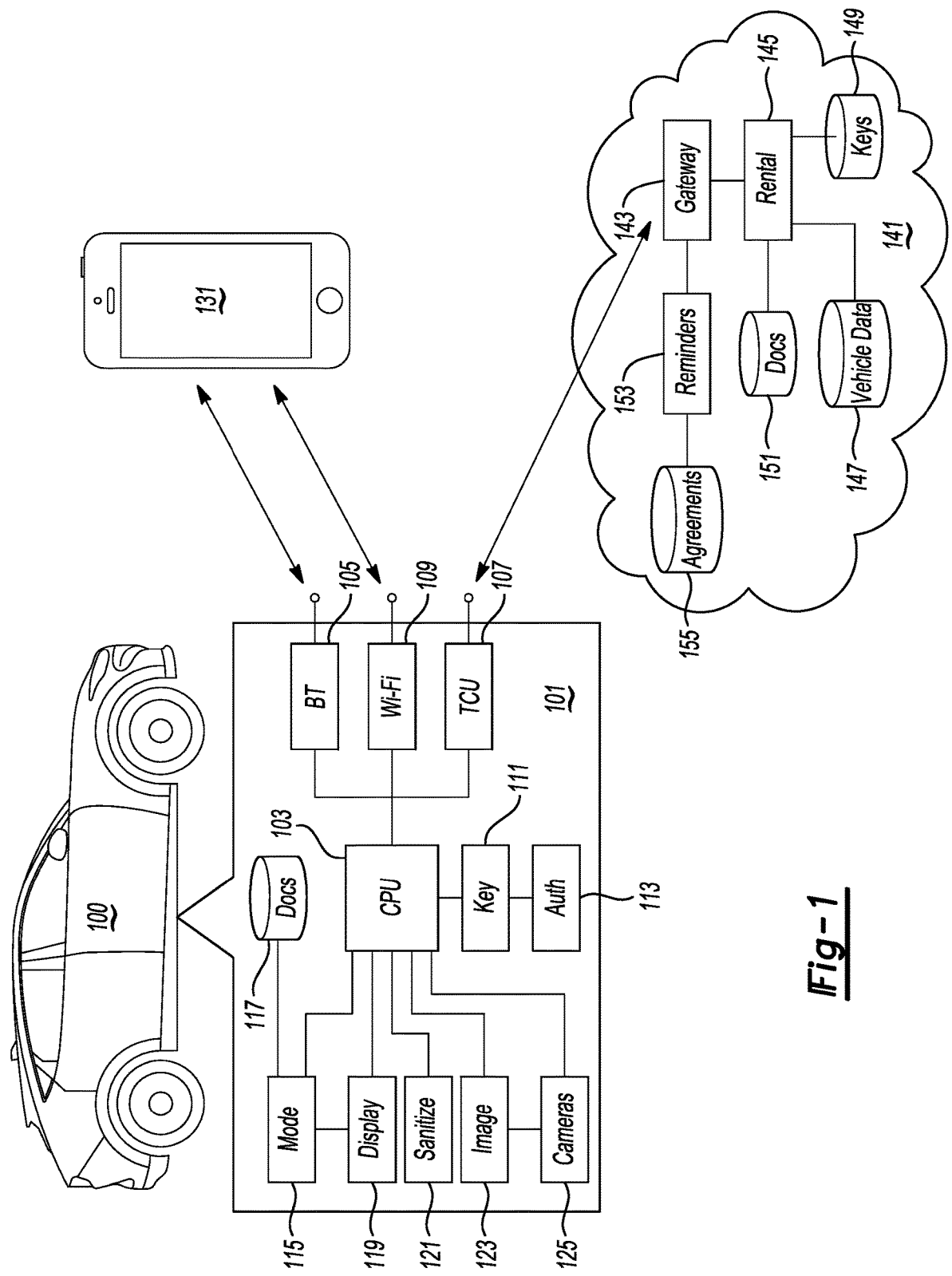
FIG. 1 shows an illustrative example of a personal vehicle rental system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Connected vehicles have an opportunity to address many issues with the personal-vehicle-rental model. Connected vehicles include a wireless connection to remote resources, and are capable of retrieving information from those resources as well as reporting information to those resources. Current rental models leverage mobile devices to serve these needs, but those devices can be lost and/or unpowered, and those devices are further outside control of a vehicle manufacturer and/or owner. That is, for a connected device to even approach the possible functionality of a connected vehicle, a manufacturer or owner will possibly have to grant significant permission to the device to access vehicle information and controls that may be suboptimal when the device is a foreign device. While an owner may not care if their own vehicle has direct access to its own bus network, they may not be willing to allow a brought-in device such access.

As the same time, having data bus access allows for direct recordation of fuel, odometer readings, diagnostic trouble codes, etc. This can replace a need to have a user actually report or log this information using a mobile device, because the vehicle can take a perfect data snapshot of the exact state of things before, during and after a rental period.

For example, if a renter is driving recklessly or off-road, the only indication an owner may have in a mobile-device scenario is discovering a diagnostic trouble code when the vehicle is returned. But when the vehicle can self-monitor, it can track its location (off-road) or speed, as well as suspension demands (proving a pothole was hit at 60 mph) and other factual and irrefutable information leading up to the issuance of the DTC. This gives the owner some greater assurance that their vehicle will not be abused, and may provide an incentive for the renter to behave more appropriately.

From a renter perspective, if the vehicle were pulled over, the best form of documentation of insurance and registration may be the paper forms. But if those are not present, the renter may be reliant on such forms on a mobile device, if available. Problematically, the mobile device may be unpowered, and/or the renter may lack login information for obtaining such documents from a user account. If the vehicle includes digital records of such documents, however, they can be presented at any time the vehicle is powered. This can also serve as swift verification that the vehicle is, in fact, registered and insured, so the renter does not rent an unregistered and/or uninsured vehicle. Any temporary insurance covering the rental period can be displayed and/or even obtained by the renter via direct interface with the vehicle.

Direct access to the vehicle computing system, and attendant transceivers and controls, also allows for preconditioning of the vehicle in a multitude of manners. For example, vehicle networks can contain access and key information and broadcast this in a receivable format for anyone in proximity to the vehicle with proper authorization. Interior HVAC systems can be used to sanitize a vehicle and then precondition a vehicle to a preferred temperature. Renter preferences can be pushed to a vehicle and engaged and configured prior to rental.

Fleet owners, such as rental companies, may be willing to work through interfaces with mobile applications that they also provide, because they have control of both the vehicles and the mobile applications. But if a third party is providing the mobile application for temporary vehicle rental, individual vehicle owners and/or manufacturers may not want the $3^{rd}$ party application, that is effectively outside their control, to have the same level of interactibiltiy and control. Accordingly, the illustrative embodiments propose onboard vehicle systems that can create increased opportunity and circumvent some of the perceived situations that may occur with $3^{rd}$ party applications and personal vehicle rental.

FIG. 1 shows an illustrative example of a personal vehicle rental system. In this example, the vehicle 100 is a personally owned vehicle, although the same concepts presented herein could apply to rental fleets when appropriate. This vehicle includes an onboard computing system 101, which has one or more processors 103 included therewith.

The vehicle system 101 also includes one or more wireless transceivers, such as BLUETOOTH 105, cellular 107 and Wi-Fi 109. The cellular transceiver can be part of a telematics control unit 107, which may provide for long-range cellular communication. The BLUETOOTH and Wi-Fi transceivers 105, 109 may allow for local communication, which, in this instance, can be used to convey key information, among other things, to nearby devices 131 with correct permissions.

The vehicle 100 may permanently or temporarily store one or more time-limited keys 111. These keys may be enabled during certain time periods, and can be regenerated or reused as appropriate. For example, in one instance, a digital key may alone be sufficient for vehicle access and startup, if the key is only enabled for the relevant time period and is provided to the correct user and then is deleted when the period expires—i.e., each use includes generation of a new key. In another instance, a more permanent key may be used, but may require accompanying user credentials, such as a mobile device ID and/or private key encryption exchanges, proving that a particular user is authorized to use that key at that time, and that the particular user (or at least their identified and known device) is present.

Authorization processes 113 on the vehicle 100 can be used to both validate key usage requests and/or to wirelessly issue keys and/or credentials as needed. In at least one example, a vehicle 100 will broadcast the wireless keys and credentials within a certain window of time before, during and/or after a rental period, as needed. Approved and validated devices can receive and decrypt the broadcast, obtaining keys for usage as needed. In another example, a renter device may be provided with wireless access credentials for the vehicle, allowing the renter to directly access a vehicle wireless network. These credentials may be time-limited, but would allow a renter to access the network with approval and directly request a key and/or credentialing to use a key.

A mode-shift process 115 can place the vehicle 100 into a rental mode. Vehicles may have use-limited modes, such as valet modes or rental modes, which restrict certain owner-designated functionality. This can include, for example, range governance, speed governance, locking certain cabin or vehicle elements (e.g., a trunk or compartment), etc. In a rental mode, specifically, the vehicle may present an HMI option for insurance or rental agreement sharing, may record vehicle data more aggressively and robustly, may provide ongoing notification to both drivers and owners about in-scope and out-of-scope usage and may generally serve as a continual monitor of the rental process, so that both parties have assurances about adherence to agreement terms. Any necessary vehicle documentation, including insurance, registration, manuals, etc. can be stored in a document repository 117 and accessed on-demand through a vehicle interface 119.

The vehicle 100 may also include a sanitization process 121, which can include heating the vehicle interior to kill lingering bacteria. The process may use a combination of sensors to determine the lack of people or items that could be affected by such a process, and there could be a manual override available on a display 119 while the process was underway, to allow for immediate termination.

The vehicle 100 may also include an ability to image 123 the vehicle interior and/or exterior surfaces through cameras 125, which can be used to provide a record of vehicle conditions before, during and after a rental period. Imaging can be dynamically engaged responsive to, for example, a vehicle incident event detection, so that the owner can possess an ongoing series of images if the vehicle is involved in an insurance-related event while the vehicle is under rental.

A cloud system 141 may be provided by a vehicle manufacturer for further support and control capability. This system may provide may connected vehicle functions, and may include a gateway 143 for request routing. In this instance, requests for rentals and/or reminders may be sent to and from the cloud.

Rental requests may be handled by a rental process 145. This process can track vehicle 100 availability (as designated by an owner), as well as locations, permissible usages and current states. The process can generate temporary usage keys 149 when needed, and convey such keys to the vehicle 100 during the corresponding time rental periods.

A vehicle data record 147 can be kept for each vehicle 100. This can include current and prior DTCs, vehicle state information, last oil change, last tire change, last brake change, etc. This can also include mileage tracking, fuel tracking, oil life tracking, etc. A renter may be able to view maintenance information on a vehicle, and an owner can confirm that a vehicle was returned in condition similar to that in which it was rented. The vehicle itself can track all this information before, during and after the rental, so a complete record of usage and responsibility can be preserved. Vehicle documents 151, such as insurance, registration and manuals, may also be preserved.

A reminders process 153 may also reside in the cloud. This process can issue reminders related to an ongoing rental and/or an upcoming rental. That is, if an agreement 155 stipulated certain return times, return states and/or usages, the reminders process could notify the current renter of any out-of-bounds behavior and/or reminders of obligations as relevant time periods (e.g., rental end) approached. If a rental period was approaching, the process could remind an owner not to take the vehicle on a long journey or to leave the vehicle in an agreed-upon location and/or state (e.g., empty). The process may even be able to communicate with the vehicle 100 to confirm that personal belongings had been removed from a cabin both before rental and at the conclusion of a rental period (through use of onboard cameras and other sensors to detect the presence of items).

Figure 2:
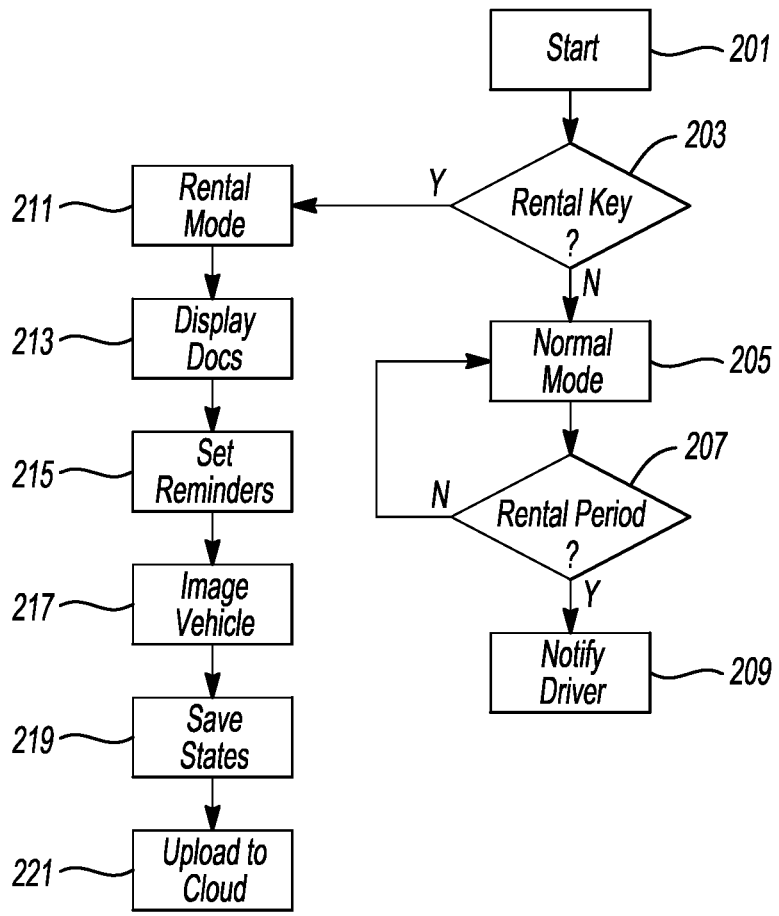
FIG. 2 shows an illustrative example of a rental mode engagement process.

FIG. 2 shows an illustrative example of a rental mode engagement process. This process detects a vehicle start at 201 and determines at 203 whether a rental key was used to start the vehicle. When a temporary code designated for rental use is used as a key, which can include a mobile device submitting a signal including a temporary authorization and/or digital key, it may be fairly easy to confirm that the vehicle was started using a rental key. If a normal physical key is used, and that key is the same key used to start the vehicle under non-rental conditions, the vehicle 100 may have to determine that the vehicle was started during a rental period. This may involve the vehicle starting in a "normal" mode at first at 205, and then the vehicle 100 determining that there is a current (or imminent) rental period at 207.

Since the vehicle may not know which driver is present (owner or renter), the vehicle 100 may notify the driver at 209. In another example, the vehicle 100 may also determine that a device having an application that corresponds to the renter is or is not present in the vehicle, even if a physical key is used, and this can be the basis for determining whether the renter or owner is the driver starting the car with the physical key.

If the vehicle 100 can confirm the renter is present, such as through the preceding techniques and the like, the vehicle may enter a rental mode at 211. This can include, for example, displaying relevant vehicle information and documents on the display at 213, or providing a selectable option for such display. These documents can include, but are not limited to, insurance, registration, rental agreement, etc. They may be displayed and/or selectable for display individually or collectively in any grouping.

The vehicle 100 may also set reminders onboard and/or in the cloud at 215, for notification to a driver when parameters are exceeded (e.g., max weight, speed, etc.) and/or for when a rental period is going to expire. These can be simple reminders or may involve calculations, such as notifying a user loading the vehicle when the max load is being approached, or determining a distance and drive-time to a designated drop-off point, compared to an amount of time remaining in a rental period. In the latter instance, the user may be notified that they should head to the drop-off when the travel time to the drop-off point will result in them reaching the drop-off within a threshold time of when the vehicle is due—i.e., so that they are not late.

As part of entering the rental mode, the vehicle 100 may also image interior and exterior vehicle condition at 217, to the extent vehicle cameras permit, to establish the condition of the vehicle at the time of rental start. Similarly, the vehicle 100 can save all states at 219, such as, but not limited to, oil life, fuel level, tire pressure, etc. This can also include recordation of any diagnostic trouble codes (DTCs) that may be present when the vehicle is first entered into rental mode for a rental period. Saving such states can allow for evidence of misuse or evidence of a prior condition, if there is a dispute about who caused an issue with the vehicle 100. The vehicle 100 uploads the relevant data to the cloud 221 as well, where it can be shared with the owner and renter, and any necessary $3^{rd}$ party, as appropriate, and where it should be difficult to manipulate and/or delete.

Figure 3:
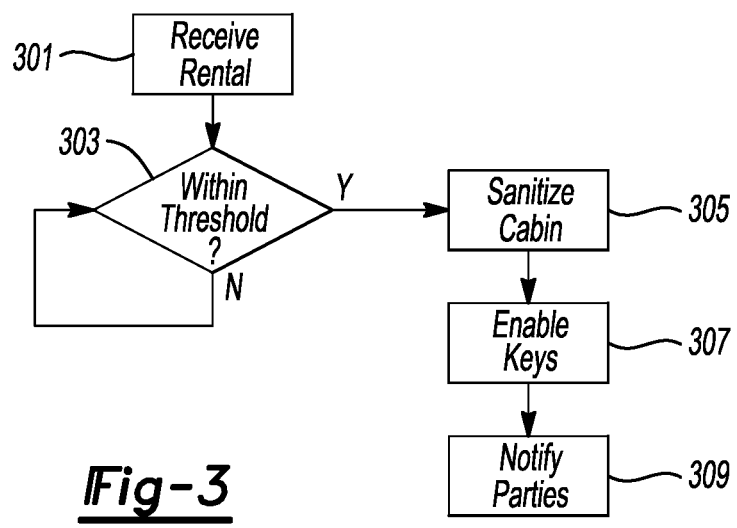
FIG. 3 shows an illustrative example of a rental preconditioning process.

FIG. 3 shows an illustrative example of a rental preconditioning process. In this example, the vehicle 100 will ready itself for a rental period by preconditioning. The vehicle 100 receives one or more rental time-periods that are considered relevant at 301. When the rental period approaches within a threshold at 303, the vehicle 100 may precondition.

In this example, preconditioning can include raising an internal vehicle temperature at 305 to sanitize the cabin, which may first require verification that no people or pets are present, and possibly that no devices, detectable through RF signatures and the like, that could be affected by temperatures, are present. Preconditioning may also involve temporarily rolling down windows to neutralize cabin smells, which can involve the vehicle determining weather and exterior conditions to prevent the entry of rain, pollen, snow, etc. Pumping air through the cabin while the windows are lowered may result in the expulsion of any lingering odor. Other tasks, such as setting a preferred climate setting or neutralizing the interior climate to an exterior temperature (when the exterior temperature is not excessive in either direction) may also be performed. Preferred climate may be indicated by renter express instruction or preferences in a renter profile, and neutralization may occur when no preferences are indicated. In the case of extreme temperatures—e.g., below 55 degrees or above 85 degrees, the vehicle may precondition to a more moderate interior temperature, such as 70 degrees. Temperature adjustment may also follow sanitization, to prevent the vehicle being overly hot from residual heat when a rental period begins.

The threshold of time relative to rental period proximity may be a function of how long the preconditioning process is projected to take—e.g., on an already hot day, sterilization may be fast, but cooling may require some time, on a cold day sterilization may take significantly longer, but the vehicle 100 may naturally cool to a comfortable temperature fairly quickly.

The vehicle 100 can also enable any user keys at 307, which can include downloading keys from the server and/or transmitting or instructing transmission of keys to a third party renter. All involved parties may also be notified by the vehicle 100 of the preconditioning process as it is ongoing, as well as be provided with an abort option, if the vehicle 100 is not to be rented for some reason or if the renter is running late, for example.

Figure 4:
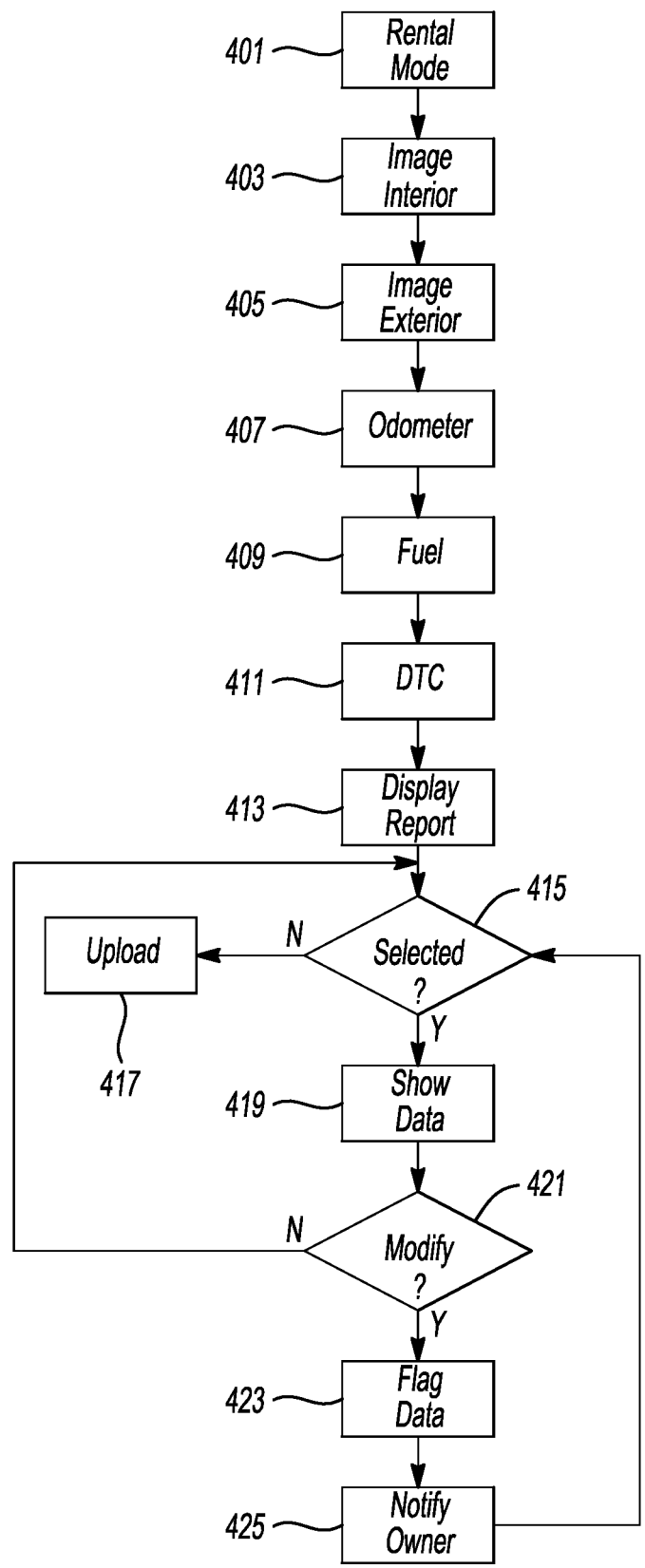
FIG. 4 shows an illustrative example of a rental mode data capture and transition process.

FIG. 4 shows an illustrative example of a rental mode data capture and transition process. This is a more detailed example of what may occur when a vehicle transitions into or out of rental mode at 401. Versions of this process can occur at both instances, and variants to the process may be appropriate based on whether the vehicle is entering or exiting rental mode.

As part of the rental transition, the process may image the vehicle interior at 403. This may involve asking any occupants to exit the vehicle, or may occur quickly when a vehicle 100 is unlocked with a rental key, prior to anyone entering the vehicle. The vehicle 100 may also remain locked until the process is complete, providing notice to the renter that the unlock will complete shortly. Whether occupants are locked out momentarily and/or asked to leave may also be partially dependent on weather or other factors, this may optionally be overridden in rain, snow, extreme temperatures, late at night, etc.

The process may further image the vehicle exterior at 405, if the vehicle has cameras capable of this process, such as 360 degree view cameras. This may not provide a perfect view of the vehicle 100, but may at least capture some data on the condition of the exterior of the vehicle 100. Imaging in this manner may require doors in certain states, so the occupants may be asked to close doors and/or leave doors closed until this process completes. Lock-out is again an option, for a time period while the imaging completes.

Certain vehicles 100 may include drones or mobile cameras provided thereto, and this process can include automatically launching a drone to circle the vehicle. Overhead and clearances to adjacent vehicles may be considered by the vehicle 100 prior to launching a drone that will fly above and circle the vehicle 100.

The vehicle may also capture the odometer at 407. This data can be used as proof of miles traveled, as well as used to notify a driver if an agreed-upon mileage is being exceeded. The latter calculation can also include a default addition of any distance required to travel from a present location back to a drop-off point, so that the vehicle can tell a driver about excessive mileage prior to it being too late for the driver to do anything about it.

Fuel levels may be recorded as well at 409. Again, this can be used as a reference point for refueling requirements, as well as in calculations involving travel time—if a tank is half full and the driver is 20 minutes from a gas station, the vehicle can subtract this travel time and refill time to any total time remaining in the rental, so the driver knows that any remaining time reflects the need to refill the vehicle as well. The vehicle 100 can also direct the driver to a nearest and/or cheapest refueling point when the time remaining in a rental period drops below a threshold.

The vehicle may further log any DTCs at 411. This not only serves as a reference point for any disputes, as previously mentioned, but also allows the renter to confirm whether a condition, such as a flat tire, exists upon entry. If there are any DTCs that should give cause for alarm, the renter and owner may be notified of the DTCs. The renter may be able to void or adjust the rental agreement based on the presence of certain DTCs at inception of a rental period.

The vehicle 100 may also display a report in-vehicle showing all the results of the data logging at 413. This can include displays of any images of the vehicle 100 which may include cosmetic issues. Certain of the data may be selectable and/or modifiable, such as selecting an image of an interior space with a hole in it, so the renter can circle the hole as a prior cosmetic issue. Other data may not be modifiable, such as fuel level and odometer readings. Users may also be precluded from certain resets in rental mode, such as resetting an oil life or other alert so that the DTC is quashed or silenced, even though the user did not, for example, actually replace the oil.

IF a modifiable DTC is not selected at 415, the renter may agree to the report and status of the vehicle and the data can be uploaded at 417. This can result in storage of the data in the cloud and issuance of the data as a report to both the renter and owner. The data can also be used for a temporary insurance policy issuance, if such an option is included as part of the rental process. In that instance, the insurance company would also get a copy of the data.

If any data is selected for highlighting or modification at 415, the process can show the data in a manipulable manner at 419—such as providing for drawing on an image with a finger or stylus, or other manipulation as necessary. If the vehicle lacks a touch-sensitive display, this information can be pushed to a phone display serving as a temporary proxy for a vehicle display. If the user modifies the data at 421, the data can be flagged at 423 and the process can notify the owner at 425. This lets the owner know of any possible issues at the time of rental, in case the owner happens to be nearby or present and wants to verify any issues. This also allows the owner to understand any possible modifications to the agreement that may be enabled based on certain data or states. For example, a user could select a TPMS sensor showing a low reading and tell the owner "I will continue the rental and fill your tire, but if this tire is actually flat, I will terminate the rental. I would like $10 off the price of the rental for the inconvenience in any event." The owner can confirm the presence of the DTC and take action based on the request.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
one or more processors configured to:
   determine that a vehicle is under use in a temporary-user state for which a temporary use period is defined;
   responsive to the vehicle being under use in the temporary use state, engage a vehicle temporary use mode, including automatic capture of vehicle states both responsive to engagement of the temporary use mode and while the mode is engaged, wherein the states include at least any diagnostic trouble codes (DTCs) present when the mode is engaged as well as any DTCs newly occurring while the mode is engaged;
   responsive to the engagement of the temporary use mode, display at least one of vehicle documentation or a selectable option to display vehicle documentation on a vehicle display;
   monitor the vehicle while use of the vehicle is performed during the temporary use period; and
   notify a driver, via the vehicle display, of vehicle use, determined by the monitoring, that does not conform to any restrictions defined by an agreement relating to the temporary use period.

2. The system of claim 1, wherein the vehicle being under use in the temporary user state is determined based on a key was used to start the vehicle.

3. The system of claim 1, wherein the vehicle being under use in the temporary user state is determined based on a detected wireless device predefined as belonging to a designated temporary user.

4. The system of claim 1, wherein the vehicle states include an odometer reading.

5. The system of claim 1, wherein the vehicle states include a fuel level reading.

6. The system of claim 1, wherein the processor is further configured to transmit at least one DTC, captured while the mode is active to at least one of a remote server or a predefined mobile device of an owner of the vehicle.

7. The system of claim 1, wherein the vehicle states include imaging at least an interior or exterior of a vehicle using vehicle cameras.

8. The system of claim 1, wherein the vehicle documentation includes registration and insurance information.

9. The system of claim 1, wherein the processor is configured to display, responsive to the engagement of the temporary use mode, information relating to at least one DTC, captured responsive to the engagement of the temporary use mode, on a display of the vehicle.

10. The system of claim 1, wherein the one or more processors are further configured to notify the driver when the temporary use period is within a threshold of expiration.

11. The system of claim 10, wherein the threshold of expiration is determined based at least in part on projected travel time to return the vehicle to a predesignated drop-off location.

12. The system of claim 10, wherein the threshold of expiration is determined based at least in part on at least one of projected travel time or refueling time involved in returning a vehicle fuel level to a fuel level state captured when the mode was engaged.

* * * * *